United States Patent Office 3,320,527
Patented May 16, 1967

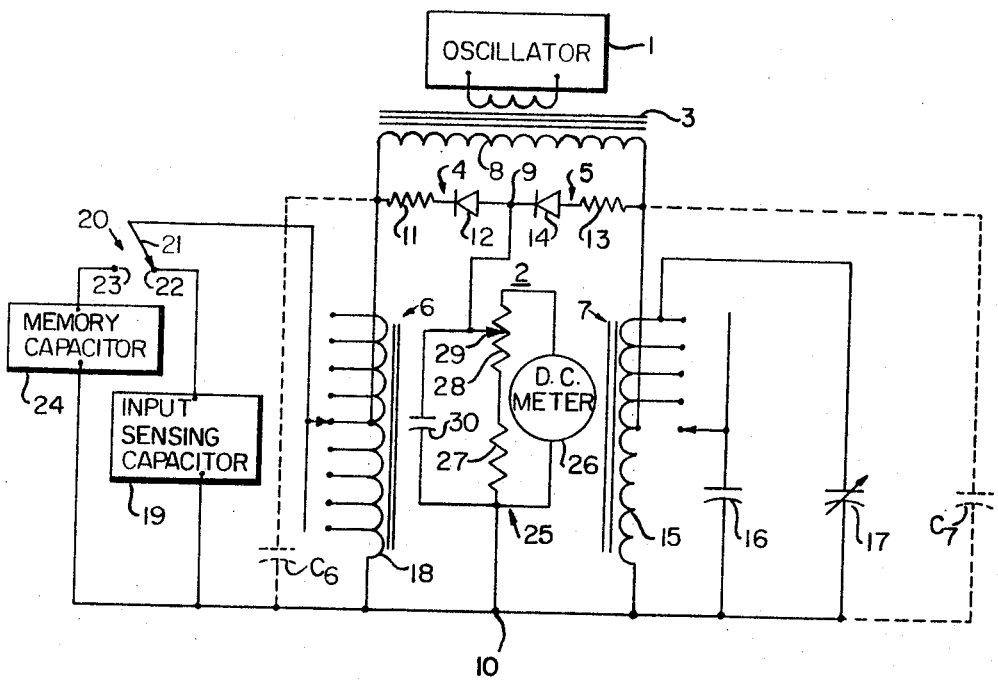
JACOB MARLOW, INVENTOR.
BY Robert L. Marben
ATTORNEY

3,320,527
CAPACITANCE BRIDGE CIRCUIT INCLUDING A TRANSFORMER FOR SELECTIVE TRANSFORMATION OF THE INPUT CAPACITANCE
Jacob Marlow, King of Prussia, Pa., assignor to Robertshaw Controls Company, a corporation of Delaware
Filed Nov. 2, 1962, Ser. No. 235,093
7 Claims. (Cl. 324—60)

The invention presented herein relates to a novel capacitance bridge circuit and more particularly to a capacitance bridge circuit operated as an unbalanced bridge which operates over a wide range of change in capacitance at a sensing element without need for substituting or adding parts of the circuit at an installation or need for an auxiliary phase sensing circuit to provide an unambiguous, linear direct current of a predetermined range at the ouput of the bridge.

In some fields of instrumentation where an indication is needed of a change of a condition, it is desirable or expedient to sense such change by the use of a sensing capacitor that is responsive to the change in the condition. For example, there are devices for detecting the level of material in a container which use a capacitance sensitive probe as the variable element of a unbalanced bridge circuit. The output of the bridge provides an indication of the level of the material in the container. Since capacitance is used as the variable and the bridge is operated as an unbalanced bridge, it is necessary that such a bridge be driven by an oscillator having constant frequency and amplitude. It is, of course, desirable that the magnitude of the output signal vary linearly with the change in capacitance at the probe. It is known, however, that the output of a simple capacitance-resistance bridge is inherently non-linear. This non-linearity is not significant for small unbalance and can be neglected provided the capacitance change sensed by the bridge is small. However, this is not always the case since the amount of change of capacitance at the sensing probe is subject to such factors as the type of material being stored and the change in level of the material being monitored, making the simple capacitance-resistance bridge configuration of limited value for such use. In addition, the range of temperature to which the bridge may be subjected may result in a zero drift which is too large to permit operation of the bridge with a small range of change in capacitance.

Another desirable feature of a device used in such an installation is the need for a direct current output signal which is of one polarity when the change of capacitance from the balance or zero set condition is positive and which is of the opposite polarity when the change of capacitance from the balance or zero set condition is negative. An alternating current output, such as that available from a simple capacitance resistance bridge, though changing in magnitude in accordance with changes in capacitance at the probe, is ambiguous since the signal does not indicate the direction of change of such capacitance.

It is also known that for maximum output in response to a change in one arm of a bridge, all four arms of a bridge should be equal. While it is possible to obtain this in a simple resistance-capacitance bridge for a particular installation and that such a bridge will provide a linear output signal if the change in capacitance is small, it is apparent that a more versatile circuit is needed to provide the desired operating characteristics mentioned above. Also, since a variety of conditions exist in which a capacitance bridge may be used as outlined above, it is desirable that such a bridge be sufficiently versatile for use in a variety of situations without need for adding or substituting parts at an installation.

It is, therefore, an object of this invention to provide a capacitance type bridge having an unambiguous direct current output signal of a predetermined magnitude in response to a wide range of change in capacitance at an input sensing capacitor.

Another object is to provide such a signal over the entire range of an input sensing capacitor variation that only a relatively narrow variation in the impedance of the arms of the bridge from the optimum condition, i.e., all arms equal to provide maximum output in response to an increment of change in capacitance, will result.

A further object is to provide an unambiguous, linear direct current output signal without the use of an auxiliary circuit for resolving any ambiguity.

Still another object is to attain the foregoing objects in such a manner as to compensate for the otherwise non-linear relationship existing between the output signal versus change in capacitance.

An additional object is to provide a memory capacitance circuit for use with the bridge to provide a capacitance corresponding to the capacitance at the input sensing capacitor when the bridge is balanced which can be used later as a reference should the span of change in capacitance at the input sensing capacitor exceed the span estimated when initially balancing the bridge.

Such a capacitance bridge circuit has been obtained by the use of a variable transformer in each of two arms of a four-arm bridge. The variable transformer means can be a multiple tap auto-transformer, for example. An input or variable capacitor and a memory capacitor are arranged to be selectively connected to one auto-transformer while and adjustable capacitance is connected to the other auto-transformer to provide zero set adjustment. The transformers transform the capacitance connected to them so that all changes in capacitance at the input capacitor which may be encountered appear to the bridge as relatively uniform changes which are small enough to maintain the output signal of the bridge with respect to change in capacitance within a predetermined limit and also maintain the impedance of the arms of the bridge near the optimum of four arm equality for maximum ouput in response to changes in capacitance from the zero setpoint. In addition, the auto-transformers provide a direct current path which otherwise would not be available if the capacitances were connected directly in the arms of the bridge. Another important function of the auto-transformers is to correct for the inherent non-linearity of the output of a capacitance bridge by introducing an inductive component to the bridge. Though the zero set adjustment could be accomplished by a variable impedance element without the use of an auto-transformer, a bridge having both auto-transformers will have better temperature compensation and, therefore, less drift over a wide range of operating temperature. The bridge is driven by an oscillator of constant frequency and amplitude the output of which is coupled to the bridge by use of a transformer. Each of the other two arms of the bridge includes a resistor connected in series with a diode. These two arms are connected in series with the diodes electrically oriented in the same direction. The two series connected arms are then connected across the secondary winding of the oscillator output transformer. The output of the bridge is taken from the connection intermediate the two auto-transformers and the connection intermediate the other two arms of the bridge. The output signal is a direct current since the diodes rectify the unbalance signal supplied by the oscillator. In addition, the diodes as arranged cause the direct output current to flow in one direction when the bridge is moved off balance by an increase in capacitance in the variable arm of the bridge and in the opposite direction when the bridge is moved off balance by a decrease in capacitance in the variable arm of the bridge.

A single drawing is used, which with the following description will make the foregoing and other objects and advantages of the invention more apparent. The drawing is a schematic of a bridge circuit embodying the invention described herein.

Referring now to the drawing, the circuit used to illustrate the basic principles of this invention includes an oscillator 1 providing a signal of constant frequency and amplitude to drive a bridge circuit 2. The oscillator 1 is coupled to the bridge circuit 2 via an output transformer 3. The bridge circuit 2 has four arms which are identified by reference numerals 4–7, inclusive. The arms are connected in the usual manner. Thus, arms 4 and 5, which present a fixed impedance during one-half cycle, are connected to form a series circuit which is connected in parallel with the secondary winding 8 of transformer 3. Similarly, arms 6 and 7 are connected to form a series circuit which is also connected in series with the secondary winding 8 of transformer 3. Arms 4 and 6 are connected to one end of secondary winding 8, while arms 5 and 7 are connected to the other end of secondary winding 8. The output signal from bridge 2 is obtained between the connection 9 which is the connection common to arms 4 and 5 and the connection 10 which is the connection common to arms 6 and 7.

Arm 4 includes a resistor 11 connected in series with a diode 12. Arm 5 is similarly constructed using a resistor 13 of the same value as resistor 11 connected in series with a diode 14 of the same type as that used for diode 12. Arms 4 and 5 are connected in series with diodes 12 and 14 electrically oriented in the same direction.

Arm 7, which provides for the coarse zero and fine zero adjustment of the bridge, includes an auto-transformer 15 having a multiplicity of taps one of which is connected to the connection common to secondary winding 8 of transformer 3 and arm 5. One end of the transformer 15 is electrically connected to the output connection 10. Arm 7 also includes a fixed capacitor 16 arranged to have one side connected to any one of the taps of transformer 15 with its other side electrically connected to output connection 10. The capacitor 16 and the turns of transformer 15 across which it is connected provide the coarse zero adjustment for the bridge. Arm 7 also includes a variable capacitor 17 having one side connected to one of the taps of transformer 15 and its other side electrically connected to output connection 10. In the circuit shown, capacitance 17 is connected to the tap at the end of the transformer 15 away from output connection 10. The particular tap to which capacitance 17 is connected merely determines the range of capacitance through which it must be capable of being varied to provide the fine zero adjustment for the bridge.

Arm 6, which is the variable impedance input arm of the bridge, includes a similar auto-transformer 18 having the same total number of turns as transformer 15 with a multiplicity of tap connections. One of the tap connections is connected to the connection common to the secondary winding 8 of transformer 3 and arm 4. One end of auto-transformer 18 is connected to the output connection 10. Arm 6 also includes an input sensing capacitor 19 having one side electrically connected to the output connection 10 with its other side arranged to be connected to any one of the tap connections of transformer 18. The particular tap connection selected for connection of capacitance 19 to the bridge determines the coarse span for the bridge. In the circuit shown, such arrangement includes a two-position switch 20 having a movable contact 21 and two fixed contacts 22 and 23. Fixed contact 22 is shown connected to capacitor 19. The movable contact 21 is arranged to be connected to any one of the tap connections of auto-transformer 18. A memory capacitor 24, which can be a single variable capacitor or a number of capacitors arranged to provide a variable capacitor, has one side electrically connected to the output connection 10 and has its other side connected to fixed contact 23 of switch 20. The function of memory capacitor 24 is explained in connection with the description of the operation of the bridge.

Since auto-transformers 15 and 18 serve to transform the capacitance connected to them, arms 6 and 7 can be represented schematically as lumped capacitors $C_6$ and $C_7$ as shown by the dotted lines in the drawing. Capacitors $C_6$ and $C_7$ represent the capacitance transformed by auto-transformers 18 and 15 respectively.

An indicating circuit 25 is shown connected between the output connections 9 and 10 of bridge 2. This circuit includes a direct current meter 26 shunted by a fine span adjustment or attenuating circuit which includes a fixed resistor 27 connected in series with a potentiometer 28. The movable tap 29 of the potentiometer 28 is connected to the output connection 9. With this shunt arrangement the current through meter 26 may be adjusted. Thus, when capacitor 19 is sensing too great a change of capacitance to be encountered in a particular installation, the current through meter 26 will be too high but can be adjusted by the fine span adjustment circuit until the meter reads full scale.

A capacitor 30 is connected between the movable tap 29 and the end of resistor 27 connected to meter 26. Capacitor 30 serves to integrate the one-half cycle pulses resulting from phase sensing detection and thus produce smooth direct current through the meter.

A better understanding of the invention and operation of the bridge circuit is possible by considering some of the values used for the various elements in an actual embodiment of the circuit shown in the drawing. Thus, resistors having a value of 160 ohms were used for resistors 11 and 13 with a 500 kc. oscillator used to drive the bridge. The fine span adjustment circuit was designed to provide adjustment of the output current passing through meter 26 and provides sufficient overlap for a continuous adjustable span. The fine span adjustment circuit permits each span step to be widened 2.5 times without zero adjustment. Thus, with any transformed change of capacitance span $\Delta C_6$ in the range of 128 pf. minimum to 320 pf. maximum the fine span adjustment circuit can be used to adjust the flow of output current to the meter to provide a full scale reading at any point within range change of the span. Auto-transformers 15 and 18 each have the same number of turns, i.e., 192, to reduce the zero drift with temperature changes. Considering the turns associated with each tap connection on auto-transformer 18, it can be seen how the effective or transformed change of capacitance $\Delta C_6$ is presented to the bridge in response to a number of span steps at the input sensing capacitor 19 to provide a continuous and overlapping span adjustment. The upper tap is at the completion of the 192nd turn on the auto-transformer 19 as measured from the output connection 10. The next tap connection is at the completion of 136 turns or $192/\sqrt{2}$, the next at 96 or 192/2 etc. Thus, the adjacent tap connections turns differ by the factor $\sqrt{2}$. In the actual circuit constructed the connection to the secondary winding 8 was made at the fifth or 48 turn tap connection of each auto-transformer.

The change in capacitance sensed by the input sensor 19 is transformed to the value determined by the relationship $(n_2/n_1)^2 \Delta C_{19}$ where $n_1$ is the number of turns of the auto-transformer associated with the tap to which the secondary winding of transformer 18 is connected and $n_2$ is the number of turns of the auto-transformer associated with the tap connected to the input sensing capacitor 19.

The table below shows the various values of capacitance span at the input sensing capacitor 19 need at various tap connections to provide a uniform transformed capacitance span $\Delta C_6$ in the range of 128 pf. minimum to 320 pf. maximum to the bridge.

| ΔC₆ in pf. | | n₂ | n₃ | (n₂/n₁)² | ΔC₁₀ in pf. | |
| --- | --- | --- | --- | --- | --- | --- |
| Min. | Max. | | | | Min. | Max. |
| 128 | 320 | 192 | 48 | 16 | 8 | 20 |
| 128 | 320 | 136 | 48 | 8 | 16 | 40 |
| 128 | 320 | 96 | 48 | 4 | 32 | 80 |
| 128 | 320 | 68 | 48 | 2 | 64 | 160 |
| 128 | 320 | 48 | 48 | 1 | 128 | 320 |
| 128 | 320 | 34 | 48 | ½ | 256 | 640 |
| 128 | 320 | 24 | 48 | ¼ | 514 | 1,280 |
| 128 | 320 | 17 | 48 | ⅛ | 1,024 | 2,560 |
| 128 | 320 | 12 | 48 | 1/16 | 2,048 | 5,120 |

Thus, it can be seen that any span in capacitance at the input sensing capacitor 19 can be made to appear to the bridge as a sptn in the range of 128 pf. minimum to 320 pf. maximum by the proper selection of the auto-transformer tap connection to which the input sensing capacitor 19 is connected. It should also be noted that the coarse span change associated with a particular tap connection is overlapped by the fine span control potentiometer 28 permitted at the next tap connection to provide a continuous span adjustment of 8 pf. to 5120 pf.

The tap connections on auto-transformer 15 provide a similar transformation of the capacitance presented by capacitances 16 and 17 to permit the bridge to be zero balanced. Thus, in the circuit actually constructed capacitance 16 had a value of 90 pf. and capacitance 17 was variable from 1–30 pf. The tap connections correspond to turns of 192, 169, 142, 114 and 48. The particular tap connection to which capacitor 16 is connected is determined, of course, by the initial capacitance existing at the input sensing capacitance 19 at the particular installation condition to be used.

With diodes 12 and 14 connected as described, it can be seen that current flow through the indicating circuit 25 will be in one direction when capacitance 19 increases from its value at the zero balance condition and will be in the opposite direction when capacitance 19 decreases from its value at the zero balance condition, thus providing a signal that is unambiguous. By using diodes 12 and 14, the bridge can be used in all types of installations where a change of capacitance is used as the input variable. It should also be noted that the use of auto-transformers 15 and 18 makes the use of diodes 12 and 14 possible. If auto-transformers 15 and 18 were not used, there would be no direct current path present in arms 6 and 7.

It has been discovered that the auto-transformers in addition to providing the desired capacitance transformation needed also improve the linearity of the relationship between the output signal and change in input capacitance. This is thought to be due to the leakage inductance present at the auto-transformer 18 connected between the bridge and the input sensor capacitor 19.

Using the various values mentioned above for the elements of the bridge, operation of the bridge circuit may be best understood by considering the steps taken to place it in operation. Thus, consider the use of the bridge for monitoring the level of a material in a large tank. It is desired that a zero reading on meter 25 correspond to the lowest permissible level for the material and that the full scale reading correspond to the upper level of the material in the tank. Knowing the dielectric the constant for the material and the characteristics of the input sensor used, an estimate is made of the change in capacitance which will be experienced when the level of the material is brought from the level corresponding to zero balance to the upper level limit corresponding to full scale indication. Assume the estimate span is 1000 pf. In this case, the input sensing capacitor 19 will be connected to the third tap from the bottom of transformer 18 which with the adjustment of potentiometer 28 provides a span of 514 pf. to 1280 pf. An estimate is also made of the capacitance at the input sensing capacitance 19 with the material at the lowest permissible level, e.g., an empty tank. Assume this value is estimated to be 3200 pf. The transformed value C₆ of the 3200 pf. is 3200×($n_2/n_1$)² or 800 pf. It is then necessary for the transformed capacitance C₇ to also be 800 pf. for zero balance since arms 4 and 5 have the same impedance. With the fine zero adjustment capacitance 17, which can be varied from 1–30 pf., connected to the 192 turn tap and the bridge connected to the 48 turn tap, it is possible to obtain up to 480 pf. as the transformed capacitance C₇ from capacitance 17 alone. In this case, capacitance 17 cannot provide the capacitance needed to zero balance the bridge so it is necessary that capacitance 16 be connected to the transformer 15. Connection of capacitance 16 to the 114 turn tap of auto-transformer 15 will cause the 90 pf. capacitance of capacitance 16 to be transformed to approximately 507 pf. Then, by adjustment of capacitance 17 the 800 pf. needed to balance the bridge for zero current output can be obtained. After adjusting the bridge for zero current output switch 20 is operated to disconnect capacitance 19 from auto-transformer 18 and connect memory capacitor 24 to the same tap on the transformer 18. Capacitor 24 is then adjusted to have the meter 26 read zero. Switch 20 is then operated to disconnect memory capacitor 24 from the bridge and again connect input capacitor 19 to the bridge. The tank is then filled to the desired upper level and the fine span adjustment made using potentiometer 28 to cause meter 26 to read full scale. This adjustment will be possible provided the estimated change in capacitance of capacitance 19 falls within the limits of the span step selected. If it is not possible to adjust potentiometer 28 to obtain a full scale reading on meter 26, it means the estimated change in capacitance of capacitance 19 is in error and a new coarse span step must be selected. If meter 26 reads too high, the second tap from the bottom of the auto-transformer 18 is used for the new coarse span step. If the meter 26 reads below full scale, the fourth tap from the bottom of the auto-transformer is used for the new coarse span step. Capacitor 19 is then connected to the appropriate tap connection. However, by connecting capacitance 19 to a new tap on transformer 18 for a different coarse span step the initial zero set adjustment is no longer valid. A new zero set adjustment must be made. This requires that the bridge be returned to the condition existing for the initial zero adjustment, i.e., the lowest permissible level, which in this case has been established as an empty tank. If the tank holds a large quantity of material, it may not be feasible or practical to empty the tank. The memory capacitor 24 eliminates the need for returning the level of the material in the tank to the lowest permissible level. Thus, rather than emptying the tank so that the new zero balance adjustment can be made, switch 20 is operated to disconnect capacitor 19 from the newly selected tap connection on auto-transformer 18 and connect memory capacitor 24 to the newly selected tap connection. Capacitance 17 and/or 16 is then adjusted to obtain a zero output signal. The bridge is then zero balanced against the memory capacitance 24 which had been adjusted earlier to a capacitance value corresponding to the capacitance sensed by capacitance 19 when the material in the tank was at the zero level.

Thus, by using memory capacitor 24, the tap on auto-transformer 18 for capacitance 19 for a new coarse span step can be selected without emptying the tank to adjust the bridge for a new zero balance. Switch 20 is then operated to disconnect capacitor 24 from auto-transformer 18 and again connect capacitor 19 to the tap connection selected for the new coarse span step. The level of the material in the tank will still be at the upper level making it possible to adjust potentiometer 28 to cause meter 26 to present a full scale indication.

Though the embodiment described herein uses auto-transformers, other types of transformers may be used. Many other modifications may be made in this invention without departing from the scope of the invention as exemplified in the above described embodiment and defined in the appended claims.

What is claimed is:

1. A capacitance bridge circuit driven by an alternating current signal including first and second series circuits, said first and second series circuits being connected in parallel with said signal being applied across one of said circuits, said first series circuit including a first impedance arm connected in series with a second impedance arm, and first and second impedance arms each having a diode with said diodes electrically oriented in the same direction with respect to the alternating current signal, said second series circuit including a circuit portion connected in series with an independently adjustable impedance arm, said independently adjustable impedance arm being used to zero balance the bridge circuit when said circuit portion is subjected to a selected condition, an input sensing capacitor, a transformer providing primary and secondary windings, said circuit portion including said transformer with said primary winding connected in series with said independently adjustable impedance arm and with said input sensing capacitor connected in parallel with a selected portion of said secondary winding, and the connection intermediate said first and second impedance arms and the connection intermediate said circuit portion and said independently adjustable impedance arm providing the connections across which a D.C. output signal is presented when the bridge circuit is unbalanced, the polarity of said D.C. signal being indicative of the degree and direction of unbalance from the zero balance condition.

2. A capacitance bridge circuit driven by an alternating current signal including first and second series circuits, said first and second series circuits being connected in parallel with said signal being applied across one of said circuits, said first series circuit including a first impedance arm connected in series with a second impedance arm, said first and second impedance arms each having a diode with said diodes electrically oriented in the same direction with respect to the alternating current signal, said second series circuit including a circuit portion connected in series with an independently adjustable impedance arm, said independently adjustable impedance arm being used to zero balance the bridge circuit when said circuit portion is subjected to a selected condition, and input sensing capacitor, an auto-transformer having input and output sections, said circuit portion including said auto-transformer with said input section connected in series with said independently adjustable impedance arm and with said input sensing capacitor connected in parallel with a selected portion of the output section of said auto-transformer, and the connection intermediate said first and second impedance arms and the connection intermediate said circuit portion and said adjustable impedance arm providing the connections across which a D.C. signal is presented when the bridge circuit is unbalanced, the polarity and magnitude of said D.C. signal being indicative of the degree and direction of unbalance from the zero balance condition.

3. A capacitance bridge circuit driven by an alternating current signal including first and second series circuits, said first and second series circuits being connected in parallel with said signal being applied across one of said circuits, said first series circuit including a first impedance arm connected in series with a second impedance arm, said first and second impedance arms each having a diode with said diodes electrically oriented in the same direction with respect to the alternating current signal, said second series circuit including a first circuit portion connected in series with a second circuit portion, said first and second circuit portions each having a transformer, each of said transformers providing primary and secondary windings with the primary windings of said transformers connected in series, said first circuit portion further including an input sensing capacitor connected in parallel with a selected portion of the secondary winding of the transformer in said first circuit portion, said second circuit portion further including an independently variable capacitance connected in parallel with the secondary winding of the transformer in said second circuit portion, said variable capacitance providing means for zero balancing the bridge circuit with said input sensing capacitor responding to a selected condition, and the connection intermediate said first and second impedance arms and the connection intermediate said first and second circuit portions providing the connection across which a D.C. output signal is presented when the bridge is unbalanced, the polarity and magnitude of said D.C. signal being indicative of the degree and direction of unbalance from the zero balance condition.

4. A capacitance bridge circuit driven by an alternating current signal including first and second series circuits, said first and second series circuits being connected in parallel with said signal being applied across one of said circuits, said first series circuit including a first impedance arm connected in series with a second impedance arm, said first and second impedance arms each having a diode with said diodes electrically oriented in the same direction with respect to the alternating current signal, said second series circuit including a first circuit portion connected in series with a second circuit portion, said first and second circuit portions each having an auto-transformer, each of said auto-transformers having input and output sections with input sections of said auto-transformers connected in series, said first circuit portion further including an input sensing capacitor connected in parallel with a selected portion of the output section of the auto-transformer in said first circuit portion, said second circuit portion further including an independently variable capacitance connected in parallel with a selected portion of the output section of the auto-transformer in said second circuit portion, said variable capacitance providing means for zero balancing the bridge circuit with said input sensing capacitor responding to a selected condition, and the connection intermediate said first and second impedance arms and the connection intermediate said first and second circuit portions providing the connections across which a D.C. output signal is presented when the bridge is unbalanced, the polarity and magnitude of said D.C. signal being indicative of the degree and direction of unbalance from the zero balance condition.

5. A capacitance bridge circuit driven by an alternating current signal including first and second series circuits, said first and second series circuits being connected in parallel with said signal being applied across one of said circuits, said first series circuit including a first impedance arm connected in series with a second impedance arm, said first and second impedance arms each having a diode with said diodes electrically oriented in the same direction with respect to the alternating current signal, said second series circuit including a circuit portion connected in series with an independently adjustable impedance arm, a variable memory capacitor, an input sensing capacitor, a transformer providing primary and secondary windings, said circuit including said transformer with said primary winding connected in series with said independently adjustable impedance arms, switch means for selectively connecting either of said input sensing capacitor and said memory capacitor in parallel with a selected portion of said secondary winding of said transformer, said independently adjustable impedance arm providing means for zero balancing the bridge circuit with said input sensing capacitor connected to said transformer and responding to a selected condition, said variable memory capacitor provided for connection to said transformer via said switch means after the bridge is zero balanced and after being so connected, adjusted to zero balance the bridge, said memory capacitor then providing a capacitance which can be retained which is equal to that presented by said input sensing capacitor when responding to said selected condition, and the connection intermediate said first and second impedance arms and the connection intermediate said circuit portion and said independently adjustable impedance arm providing the connections across which a D.C. output signal is presented when the bridge is unbalanced, the polarity and magnitude of said D.C. signal being indicative of the degree and direction of unbalance from the zero balance conditions.

6. A capacitance bridge circuit driven by an alternating current signal including first and second series circuits, said first and second series circuits being connected in parallel with said signal being applied across one of said circuits, said first series circuit including a first impedance arm connected in series with a second impedance arm, said first and second impedance arms each having a diode with said diodes electrically oriented in the same direction with respect to the alternating current signal, said second series circuit including a circuit portion connected in series with an independently adjustable impedance arm, an input sensing capacitor, a transformer providing primary and secondary windings, said circuit portion including said transformer with said primary winding connected in series with said independently adjustable impedance arm and with said input sensing capacitor connected in parallel with a selected portion of said secondary winding of said transformer, said circuit portion thus providing a variable transformation of the input capacitance for obtaining a coarse span adjustment for the bridge, said independently adjustable impedance arm providing means for zero balancing the bridge circuit with said input sensing capacitor responding to a selected condition, the connection intermediate said first and second impedance arms and connection intermediate said circuit portion and said independently adjustable impedance arm providing the connections across which a D.C. output signal is presented when the bridge is unbalanced, a D.C. meter, means connecting said D.C. meter between said connections, and means providing the fine span adjustment for the bridge including an adjustable resistance conected in parallel with said D.C. meter.

7. A capacitance bridge circuit driven by an alternating current signal including first and second series circuits, said first and second series circuits being connected in parallel with said signal being applied across one of said circuits, said first series circuit including a first impedance arm connected in series with a second impedance arm, said first and second impedance arms each having a diode with said diodes electrically oriented in the same direction with respect to the alternating current signal, said second series circuit including a circuit portion connected in series with an independently adjustable impedance arm, an input sensing capacitor, an auto-transformer, said auto-transformer having input and output sections and having a multiplicity of tapped connections, said circuit portion including said auto-transformer with said input section connected in series with said independently adjustable impedance arm and with said input sensing capacitor connected in parallel with a portion of the output section of said auto-transformer via a selected one of said tap connections to establish the coarse span adjustment for the bridge, said independently adjustable impedance arm providing means for zero balancing the bridge with said input sensing capacitor responding to a selected condition, the connection impedance said first and second impedance arms and the connection intermediate said circuit portion and said independently adjustable impedance arm providing the connections across which a D.C. output signal is presented when the bridge is unbalanced, a D.C. meter, means connecting said D.C. meter between said connections and means providing the fine span adjustment for the bridge including an adjustable resistance connected in parallel with said D.C. meter.

References Cited by the Examiner

UNITED STATES PATENTS

| | | | |
|---|---|---|---|
| 1,944,315 | 1/1934 | Clapp | 324—57 X |
| 2,297,216 | 9/1942 | Hahnemann | 324—119 X |
| 3,002,150 | 9/1961 | Batteau | 324—61 |

FOREIGN PATENTS

| | | |
|---|---|---|
| 1,106,503 | 12/1955 | France. |
| 735,916 | 8/1955 | Great Britain. |

WALTER L. CARLSON, *Primary Examiner.*

W. H. BUCKLER, E. E. KUBASIEWICZ,
*Assistant Examiners.*